US012598468B2

(12) United States Patent
Tackin et al.

(10) Patent No.: US 12,598,468 B2
(45) Date of Patent: Apr. 7, 2026

(54) MULTI-CHANNEL DEVICE CONNECTION

(71) Applicant: Apple Inc., Cupertino, CA (US)

(72) Inventors: Onur E. Tackin, Saratoga, CA (US); Dhruv Samant, Mountain View, CA (US); Mahmut Demir, Dublin, CA (US); Samuel D. Post, Great Falls, MT (US); Stephen C. Schweizer, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 111 days.

(21) Appl. No.: 18/370,349

(22) Filed: Sep. 19, 2023

(65) Prior Publication Data

US 2024/0107315 A1     Mar. 28, 2024

Related U.S. Application Data

(60) Provisional application No. 63/409,560, filed on Sep. 23, 2022.

(51) Int. Cl.
*H04W 12/50* (2021.01)
*G06F 21/60* (2013.01)

(52) U.S. Cl.
CPC .......... *H04W 12/50* (2021.01); *G06F 21/606* (2013.01)

(58) Field of Classification Search
CPC ............................ H04W 12/50; G06F 21/606
See application file for complete search history.

(56) References Cited

U.S. PATENT DOCUMENTS

| | | | |
|---|---|---|---|
| 7,999,842 B1 | 8/2011 | Barrus et al. | |
| 2006/0258289 A1 | 11/2006 | Dua | |
| 2008/0291271 A1 | 11/2008 | Hansson et al. | |
| 2013/0029596 A1 | 1/2013 | Preston et al. | |
| 2015/0050881 A1* | 2/2015 | Chen ...................... | H02J 50/10 |
| | | | 455/41.1 |
| 2016/0219241 A1 | 7/2016 | Korneliussen et al. | |

(Continued)

FOREIGN PATENT DOCUMENTS

WO     WO 2022/182507 A1     9/2022

OTHER PUBLICATIONS

International Search Report and Written Opinion from PCT/US2023/033415, dated Dec. 18, 2023, 11 pages.

(Continued)

*Primary Examiner* — Amie C. Lin
(74) *Attorney, Agent, or Firm* — BAKERHOSTETLER; Kyle B. Morse

(57) ABSTRACT

Some techniques are described herein for initiating a secure communication between a mount and a computer system. Such techniques include the mount detecting that the computer system is coupled to the mount and, in response, sending a message to the computer system with an identifier of the mount. The mount then receives a request to establish the secure communication with the computer system via a different communication channel than used to send the message. For example, the message can be sent using Near Field Communication (NFC) and the request can be to establish a short-range communication channel using Bluetooth. Other techniques are described herein for reconnecting a secure communication between a mount and a computer system using similar techniques as described above.

18 Claims, 5 Drawing Sheets

(56)　　　　　References Cited

U.S. PATENT DOCUMENTS

| | | | |
|---|---|---|---|
| 2017/0251138 | A1 | 8/2017 | Yoon et al. |
| 2018/0098366 | A1* | 4/2018 | Cohn ........................ H04B 5/79 |
| 2019/0354361 | A1* | 11/2019 | Li ........................... H02J 50/12 |
| 2021/0192199 | A1 | 6/2021 | Bagwell et al. |
| 2021/0265860 | A1* | 8/2021 | Hamlin ................ H02J 7/0042 |
| 2022/0164611 | A1 | 5/2022 | Seguin et al. |
| 2022/0294271 | A1* | 9/2022 | Li ....................... H02J 7/00045 |
| 2022/0405959 | A1 | 12/2022 | Forutanpour et al. |
| 2023/0044279 | A1 | 2/2023 | Lu |
| 2023/0144091 | A1 | 5/2023 | Forutanpour et al. |
| 2023/0262317 | A1 | 8/2023 | O'Leary et al. |
| 2023/0308603 | A1 | 9/2023 | Nicholson et al. |
| 2024/0062519 | A1 | 2/2024 | Al Faruque et al. |

OTHER PUBLICATIONS

International Patent Application No. PCT/US2025/010109; Invitation to Pay Add'l Fees; dated Apr. 10, 2025; 11 pages.

International Patent Application No. PCT/US2025/010109; Int'l Search Report and the Written Opinion; dated Jun. 3, 2025; 19 pages.

U.S. Appl. No. 63/371,459, filed Aug. 15, 2022, Al Faruque et al.

International Patent Application No. PCT/US2025/020974; Invitation to Pay Add'l Fees; dated Jun. 25, 2025; 11 pages.

Farin et al.; "Minimizing MPEG-4 Sprite Coding-Cost Using Multiple-Sprites"; Visual Communications and Image Processing; vol. 5308; 2004; p. 234-245.

Sikora et al.; "Trends and Perspectives in Image and Video Coding"; Proceeding of the IEEE; vol. 93 No. 1; Jan. 2005; p. 6-17.

Young et al.; "Immersive Telepresence and Remote Collaboration using Mobile and Wearable Devices"; IEEE Transactions on Visualization and Computer Graphics; vol. 25 No. 5; May 2019; p. 1908-1918.

Muller et al.; "PanoVC: Pervasive Telepresence using Mobile Phones"; IEEE Int'l Conf. on Pervasive Computing and Communications; 2016; 10 pages.

Pece et al.; "PanoInserts: Mobile Spatial Teleconferencing"; CHI: Changing and Perspectives; Session: Video Communication; Apr. 2013; p. 1319-1328.

International Patent Application No. PCT/US2025/020974; Int'l Search Report and the Written Opinion; dated Aug. 18, 2025; 19 pages.

U.S. Appl. No. 18/370,348; Non-Final Office action; dated Sep. 10, 2025; 20 pages.

* cited by examiner

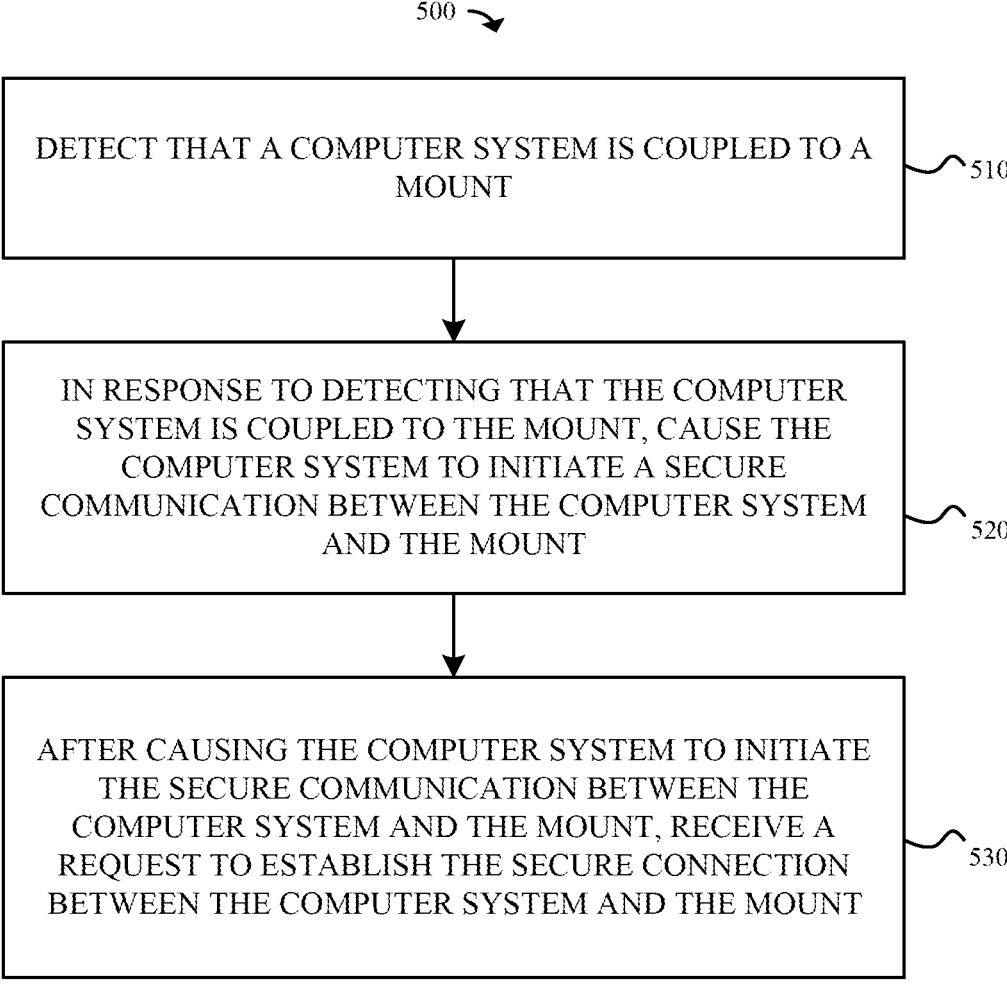

500

DETECT THAT A COMPUTER SYSTEM IS COUPLED TO A MOUNT — 510

IN RESPONSE TO DETECTING THAT THE COMPUTER SYSTEM IS COUPLED TO THE MOUNT, CAUSE THE COMPUTER SYSTEM TO INITIATE A SECURE COMMUNICATION BETWEEN THE COMPUTER SYSTEM AND THE MOUNT — 520

AFTER CAUSING THE COMPUTER SYSTEM TO INITIATE THE SECURE COMMUNICATION BETWEEN THE COMPUTER SYSTEM AND THE MOUNT, RECEIVE A REQUEST TO ESTABLISH THE SECURE CONNECTION BETWEEN THE COMPUTER SYSTEM AND THE MOUNT — 530

*FIG. 5*

MULTI-CHANNEL DEVICE CONNECTION

CROSS-REFERENCE TO RELATED APPLICATIONS

The present application claims benefit of U.S. Provisional Application Ser. No. 63/409,560, entitled "MULTI-CHANNEL DEVICE CONNECTION" filed Sep. 23, 2022, which is hereby incorporated by reference in its entirety for all purposes.

BACKGROUND

Today, electronic devices are often coupled to other devices for ensuring that the electronic devices maintain a particular position or orientation. For example, a phone can be coupled to a mount in a car so that the phone stays facing a user driving the car. More recently, the phone can sometimes be communicating with the mount to provide additional functionality, such as controlling what is being displayed. However, connecting the phone to the mount is often quite cumbersome. Accordingly, there is a need to improve techniques for connecting different devices.

SUMMARY

Current techniques for connecting devices are generally ineffective and/or inefficient. For example, some techniques require devices to be physically connected (e.g., hard wired) to communicate. This disclosure provides more effective and/or efficient techniques for connecting devices using an example of a device connecting with a mount. It should be recognized that other types of devices can be used with techniques described herein. For example, a phone can connect with a watch using techniques described herein. In addition, techniques optionally complement or replace other techniques for connecting devices.

Some techniques are described herein for initiating a secure communication between a mount and a computer system. Such techniques include the mount detecting that the computer system is coupled to the mount and, in response, sending a message to the computer system with an identifier of the mount. The mount then receives a request to establish the secure communication with the computer system via a different communication channel than used to send the message. For example, the message can be sent using Near Field Communication (NFC) and the request can be to establish a short-range communication channel using Bluetooth. In some examples, the mount also charges the computer system while the computer system is coupled to the mount. Such charging can occur through a physical connection and/or a wireless charging component. Other techniques are described herein for reconnecting a secure communication between a mount and a computer system using similar techniques as described above.

DESCRIPTION OF THE FIGURES

For a better understanding of the various described embodiments, reference should be made to the Detailed Description below, in conjunction with the following drawings in which like reference numerals refer to corresponding parts throughout the figures.

FIG. 5 is a flow diagram illustrating a method for establishing a secure communication.

DETAILED DESCRIPTION

Figure 1:
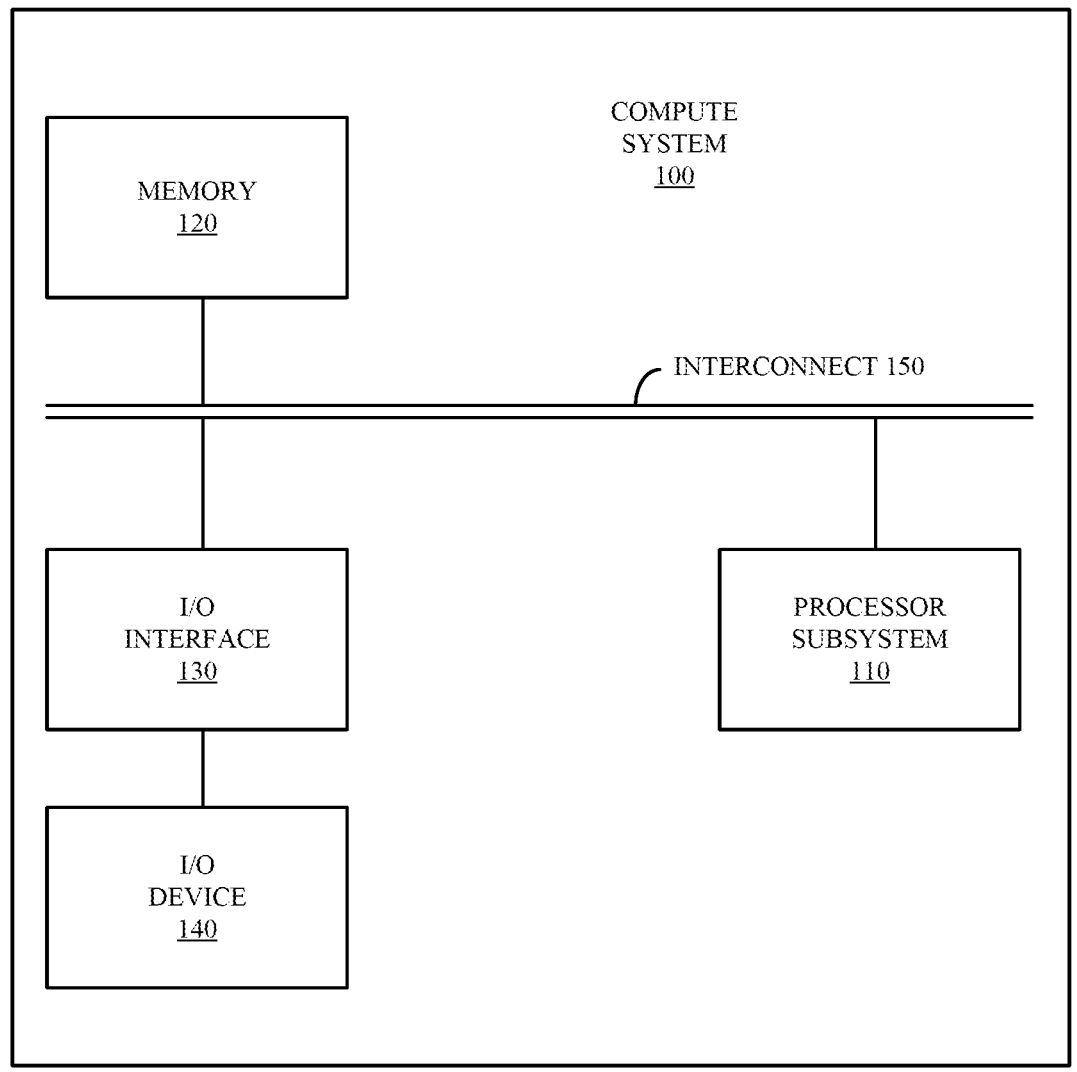
FIG. 1 is a block diagram illustrating a compute system.

The following description sets forth exemplary techniques, methods, parameters, systems, computer-readable storage mediums, and the like. It should be recognized, however, that such description is not intended as a limitation on the scope of the present disclosure. Instead, such description is provided as a description of exemplary embodiments.

Methods described herein can include one or more steps that are contingent upon one or more conditions being satisfied. It should be understood that a method can occur over multiple iterations of the same process with different steps of the method being satisfied in different iterations. For example, if a method requires performing a first step upon a determination that a set of one or more criteria is met and a second step upon a determination that the set of one or more criteria is not met, a person of ordinary skill in the art would appreciate that the steps of the method are repeated until both conditions, in no particular order, are satisfied. Thus, a method described with steps that are contingent upon a condition being satisfied can be rewritten as a method that is repeated until each of the conditions described in the method are satisfied. This, however, is not required of system or computer readable medium claims where the system or computer readable medium claims include instructions for performing one or more steps that are contingent upon one or more conditions being satisfied. Because the instructions for the system or computer readable medium claims are stored in one or more processors and/or at one or more memory locations, the system or computer readable medium claims include logic that can determine whether the one or more conditions have been satisfied without explicitly repeating steps of a method until all of the conditions upon which steps in the method are contingent have been satisfied. A person having ordinary skill in the art would also understand that, similar to a method with contingent steps, a system or computer readable storage medium can repeat the steps of a method as many times as needed to ensure that all of the contingent steps have been performed.

Although the following description uses terms "first," "second," etc. to describe various elements, these elements should not be limited by the terms. In some examples, these terms are used to distinguish one element from another. For example, a first subsystem could be termed a second subsystem, and, similarly, a subsystem device could be termed a subsystem device, without departing from the scope of the various described embodiments. In some examples, the first subsystem and the second subsystem are two separate references to the same subsystem. In some embodiments, the first subsystem and the second subsystem are both subsystem, but they are not the same subsystem or the same type of subsystem.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when," "upon," "in response to determining," "in response to detecting," or "in accordance with a determination that" depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," or "in accordance with a determination that [the stated condition or event]" depending on the context.

Turning to FIG. 1, a block diagram of compute system 100 is illustrated. Compute system 100 is a non-limiting example of a compute system that can be used to perform functionality described herein. It should be recognized that other computer architectures of a compute system can be used to perform functionality described herein.

In the illustrated example, compute system 100 includes processor subsystem 110 communicating with (e.g., wired or wirelessly) memory 120 (e.g., a system memory) and I/O interface 130 via interconnect 150 (e.g., a system bus, one or more memory locations, or other communication channel for connecting multiple components of compute system 100). In addition, I/O interface 130 is communicating with (e.g., wired or wirelessly) to I/O device 140. In some examples, I/O interface 130 is included with I/O device 140 such that the two are a single component. It should be recognized that there can be one or more I/O interfaces, with each I/O interface communicating with one or more I/O devices. In some examples, multiple instances of processor subsystem 110 can be communicating via interconnect 150.

Compute system 100 can be any of various types of devices, including, but not limited to, a system on a chip, a server system, a personal computer system (e.g., a smartphone, a smartwatch, a wearable device, a tablet, a laptop computer, and/or a desktop computer), a sensor, or the like. In some examples, compute system 100 is included or communicating with a physical component for the purpose of modifying the physical component in response to an instruction. In some examples, compute system 100 receives an instruction to modify a physical component and, in response to the instruction, causes the physical component to be modified. In some examples, the physical component is modified via an actuator, an electric signal, and/or algorithm. Examples of such physical components include an acceleration control, a break, a gear box, a hinge, a motor, a pump, a refrigeration system, a spring, a suspension system, a steering control, a pump, a vacuum system, and/or a valve. In some examples, a sensor includes one or more hardware components that detect information about a physical environment in proximity to (e.g., surrounding) the sensor. In some examples, a hardware component of a sensor includes a sensing component (e.g., an image sensor or temperature sensor), a transmitting component (e.g., a laser or radio transmitter), a receiving component (e.g., a laser or radio receiver), or any combination thereof. Examples of sensors include an angle sensor, a chemical sensor, a brake pressure sensor, a contact sensor, a non-contact sensor, an electrical sensor, a flow sensor, a force sensor, a gas sensor, a humidity sensor, an image sensor (e.g., a camera sensor, a radar sensor, and/or a LiDAR sensor), an inertial measurement unit, a leak sensor, a level sensor, a light detection and ranging system, a metal sensor, a motion sensor, a particle sensor, a photoelectric sensor, a position sensor (e.g., a global positioning system), a precipitation sensor, a pressure sensor, a proximity sensor, a radio detection and ranging system, a radiation sensor, a speed sensor (e.g., measures the speed of an object), a temperature sensor, a time-of-flight sensor, a torque sensor, and an ultrasonic sensor. In some examples, a sensor includes a combination of multiple sensors. In some examples, sensor data is captured by fusing data from one sensor with data from one or more other sensors. Although a single compute system is shown in FIG. 1, compute system 100 can also be implemented as two or more compute systems operating together.

In some examples, processor subsystem 110 includes one or more processors or processing units configured to execute program instructions to perform functionality described herein. For example, processor subsystem 110 can execute an operating system, a middleware system, one or more applications, or any combination thereof.

In some examples, the operating system manages resources of compute system 100. Examples of types of operating systems covered herein include batch operating systems (e.g., Multiple Virtual Storage (MVS)), time-sharing operating systems (e.g., Unix), distributed operating systems (e.g., Advanced Interactive eXecutive (AIX), network operating systems (e.g., Microsoft Windows Server), and real-time operating systems (e.g., QNX). In some examples, the operating system includes various procedures, sets of instructions, software components, and/or drivers for controlling and managing general system tasks (e.g., memory management, storage device control, power management, or the like) and for facilitating communication between various hardware and software components. In some examples, the operating system uses a priority-based scheduler that assigns a priority to different tasks that processor subsystem 110 can execute. In such examples, the priority assigned to a task is used to identify a next task to execute. In some examples, the priority-based scheduler identifies a next task to execute when a previous task finishes executing. In some examples, the highest priority task runs to completion unless another higher priority task is made ready.

In some examples, the middleware system provides one or more services and/or capabilities to applications (e.g., the one or more applications running on processor subsystem 110) outside of what the operating system offers (e.g., data management, application services, messaging, authentication, API management, or the like). In some examples, the middleware system is designed for a heterogeneous computer cluster to provide hardware abstraction, low-level device control, implementation of commonly used functionality, message-passing between processes, package management, or any combination thereof. Examples of middleware systems include Lightweight Communications and Marshalling (LCM), PX4, Robot Operating System (ROS), and ZeroMQ. In some examples, the middleware system represents processes and/or operations using a graph architecture, where processing takes place in nodes that can receive, post, and multiplex sensor data messages, control messages, state messages, planning messages, actuator messages, and other messages. In such examples, the graph architecture can define an application (e.g., an application executing on processor subsystem 110 as described above) such that different operations of the application are included with different nodes in the graph architecture.

In some examples, a message sent from a first node in a graph architecture to a second node in the graph architecture is performed using a publish-subscribe model, where the first node publishes data on a channel in which the second node can subscribe. In such examples, the first node can store data in memory (e.g., memory 120 or some local memory of processor subsystem 110) and notify the second node that the data has been stored in the memory. In some examples, the first node notifies the second node that the data has been stored in the memory by sending a pointer (e.g., a memory pointer, such as an identification of a memory location) to the second node so that the second node can access the data from where the first node stored the data. In some examples, the first node would send the data directly to the second node so that the second node would not need to access a memory based on data received from the first node.

Memory 120 can include a computer readable medium (e.g., non-transitory or transitory computer readable medium) usable to store (e.g., configured to store, assigned to store, and/or that stores) program instructions executable by processor subsystem 110 to cause compute system 100 to perform various operations described herein. For example, memory 120 can store program instructions to implement the functionality associated with methods 800, 900, 1000, 11000, 12000, 1300, 1400, and 1500 described below.

Memory 120 can be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, or the like), read only memory (PROM, EEPROM, or the like), or the like. Memory in compute system 100 is not limited to primary storage such as memory 120. Compute system 100 can also include other forms of storage such as cache memory in processor subsystem 110 and secondary storage on I/O device 140 (e.g., a hard drive, storage array, etc.). In some examples, these other forms of storage can also store program instructions executable by processor subsystem 110 to perform operations described herein. In some examples, processor subsystem 110 (or each processor within processor subsystem 110) contains a cache or other form of on-board memory.

I/O interface 130 can be any of various types of interfaces configured to communicate with other devices. In some examples, I/O interface 130 includes a bridge chip (e.g., Southbridge) from a front-side bus to one or more back-side buses. I/O interface 130 can communicate with one or more I/O devices (e.g., I/O device 140) via one or more corresponding buses or other interfaces. Examples of I/O devices include storage devices (hard drive, optical drive, removable flash drive, storage array, SAN, or their associated controller), network interface devices (e.g., to a local or wide-area network), sensor devices (e.g., camera, radar, LiDAR, ultrasonic sensor, GPS, inertial measurement device, or the like), and auditory or visual output devices (e.g., speaker, light, screen, projector, or the like). In some examples, compute system 100 is communicating with a network via a network interface device (e.g., configured to communicate over Wi-Fi, Bluetooth, Ethernet, or the like). In some examples, compute system 100 is directly or wired to the network.

Figure 2:
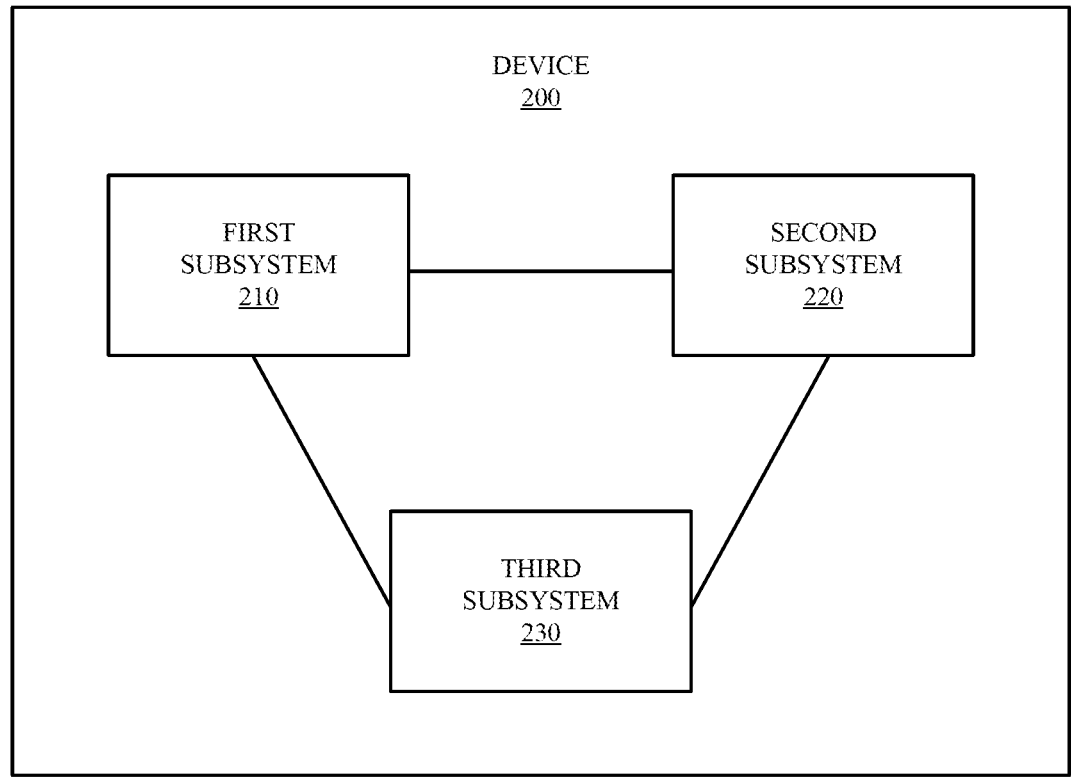
FIG. 2 is a block diagram illustrating a device with interconnected subsystems.

FIG. 2 illustrates a block diagram of device 200 with interconnected subsystems. In the illustrated example, device 200 includes three different subsystems (i.e., first subsystem 210, second subsystem 220, and third subsystem 230) communicating with (e.g., wired or wirelessly) each other, creating a network (e.g., a personal area network, a local area network, a wireless local area network, a metropolitan area network, a wide area network, a storage area network, a virtual private network, an enterprise internal private network, a campus area network, a system area network, and/or a controller area network). An example of a possible computer architecture of a subsystem as included in FIG. 2 is described in FIG. 1 (i.e., compute system 100). Although three subsystems are shown in FIG. 2, device 200 can include more or fewer subsystems.

In some examples, some subsystems are not connected to other subsystem (e.g., first subsystem 210 can be connected to second subsystem 220 and third subsystem 230 but second subsystem 220 cannot be connected to third subsystem 230). In some examples, some subsystems are connected via one or more wires while other subsystems are wirelessly connected. In some examples, messages are set between the first subsystem 210, second subsystem 220, and third subsystem 230, such that when a respective subsystem sends a message the other subsystems receive the message (e.g., via a wire and/or a bus). In some examples, one or more subsystems are wirelessly connected to one or more compute systems outside of device 200, such as a server system. In such examples, the subsystem can be configured to communicate wirelessly to the one or more compute systems outside of device 200.

In some examples, device 200 includes a housing that fully or partially encloses subsystems 210-230. Examples of device 200 include a home-appliance device (e.g., a refrigerator or an air conditioning system), a robot (e.g., a robotic arm or a robotic vacuum), and a vehicle. In some examples, device 200 is configured to navigate (with or without user input) in a physical environment.

In some examples, one or more subsystems of device 200 are used to control, manage, and/or receive data from one or more other subsystems of device 200 and/or one or more compute systems remote from device 200. For example, first subsystem 210 and second subsystem 220 can each be a camera that captures images, and third subsystem 230 can use the captured images for decision making. In some examples, at least a portion of device 200 functions as a distributed compute system. For example, a task can be split into different portions, where a first portion is executed by first subsystem 210 and a second portion is executed by second subsystem 220.

Attention is now directed towards techniques for connecting devices. Such techniques are described in the context of a phone connecting with a mount. It should be recognized that other types of devices can be used with techniques described herein. For example, a keycard can connect with a door lock to transfer authentication information from the keycard to the door lock. In addition, techniques optionally complement or replace other techniques for connecting devices.

Figure 3A:
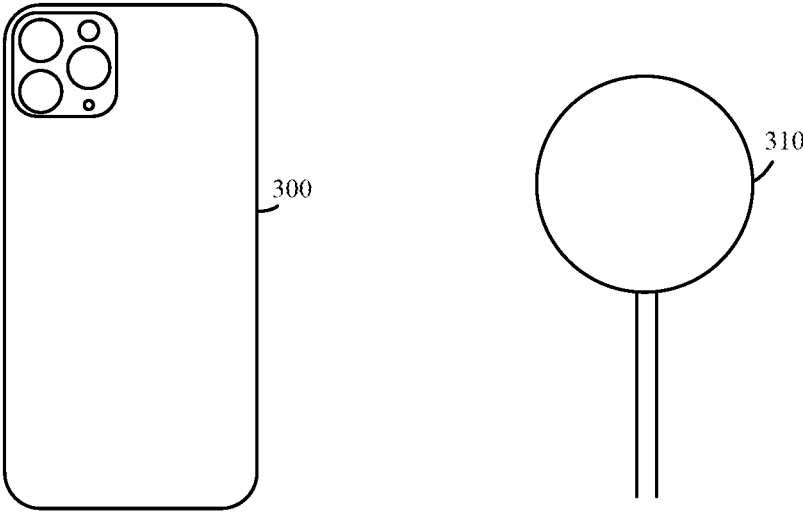
FIG. 3A is a block diagram illustrating a phone and a mount.

FIG. 3A is a block diagram illustrating phone 300 and mount 310. In some examples, phone 300 is an electronic device (and/or computer system), such as a user device (e.g., a smartphone, a smartwatch, a wearable device, a tablet, a fitness tracking device, a laptop computer, a vehicle, and/or a desktop computer). In such examples, phone 300 executes one or more software applications for providing functionality to a user of phone 300. In some examples, mount 310 is another electronic device, such as a charger (e.g., a device configured to charge another device such as phone 300), a case (e.g., a device configured to at least partially cover phone 300), a motorized stand, a vehicle, or a keycard.

In some examples, phone 300 and mount 310 each include one or more communication components for communicating with the other. In such examples, phone 300 and/or mount 310 can include one or more antennas for communicating using radio waves. In some examples, phone 300 includes a Radio Frequency Identification (RFID) reader (e.g., a Near-Field Communication (NFC) reader) to communicate with an RFID tag (e.g., a NFC tag) included with mount 310. In such examples, both phone 300 and mount 310 also includes a hardware transceiver for communicating using a wireless technology such as Bluetooth or Wi-Fi. In these examples, phone 300 can receive communications from mount 310 using the RFID reader and both devices can communicate using their respective hardware transceiver.

In some examples, phone 300 and mount 310 each include components to facilitate charging (e.g., wired or wireless charging) of phone 300 via mount 310. For example, phone 300 can include a primary coil and mount 310 can include a secondary coil. The primary coil is configured to generate an alternating current to create an electromagnetic field around the primary coil. The electromagnetic field causes the secondary coil to generate an electric current when in proximity to the primary coil. After the electric current is generated, phone 300 (e.g., a circuit of phone 300) is configured to convert the electric current into direct current to charge a power source of phone 300. In some examples, charging of phone 300 occurs in response to mount 310 detecting that phone 300 is coupled to mount 310. In other examples, charging of phone 300 occurs in response to mount 310 establishing a secure communication with phone 300.

In FIG. 3A, phone 300 is not coupled to mount 310. Instead, phone 300 is able to be moved independent of mount 310 without needing to decouple from mount 310. While not coupled to mount 310 and before establishing a secure communication with mount 310, phone 300, in some examples, is not receiving communications from mount 310. In such examples, phone 300 only begins receiving communications from mount 310 once phone 300 is coupled to mount 310, as further discussed below with respect to FIG. 3B and the flow diagrams in FIGS. 4 and 5.

Figure 3B:
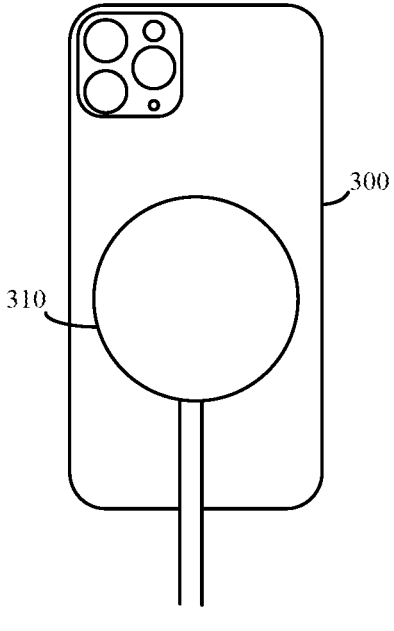
FIG. 3B is a block diagram illustrating a mount coupled to a phone.

FIG. 3B is a block diagram illustrating mount 310 coupled to phone 320. In some examples, the coupling is temporary such that mount 310 and/or phone 320 is able to decouple and recouple. Examples of temporary coupling mechanisms include magnets, movable and/or flexible physical components to hold devices together, male/female couplers, adhesive, and/or physical proximity. In some examples, when mount 310 is coupled to phone 320, one or more operations described herein are initiated, including the operations described in FIGS. 4 and 5 below.

Figure 4:
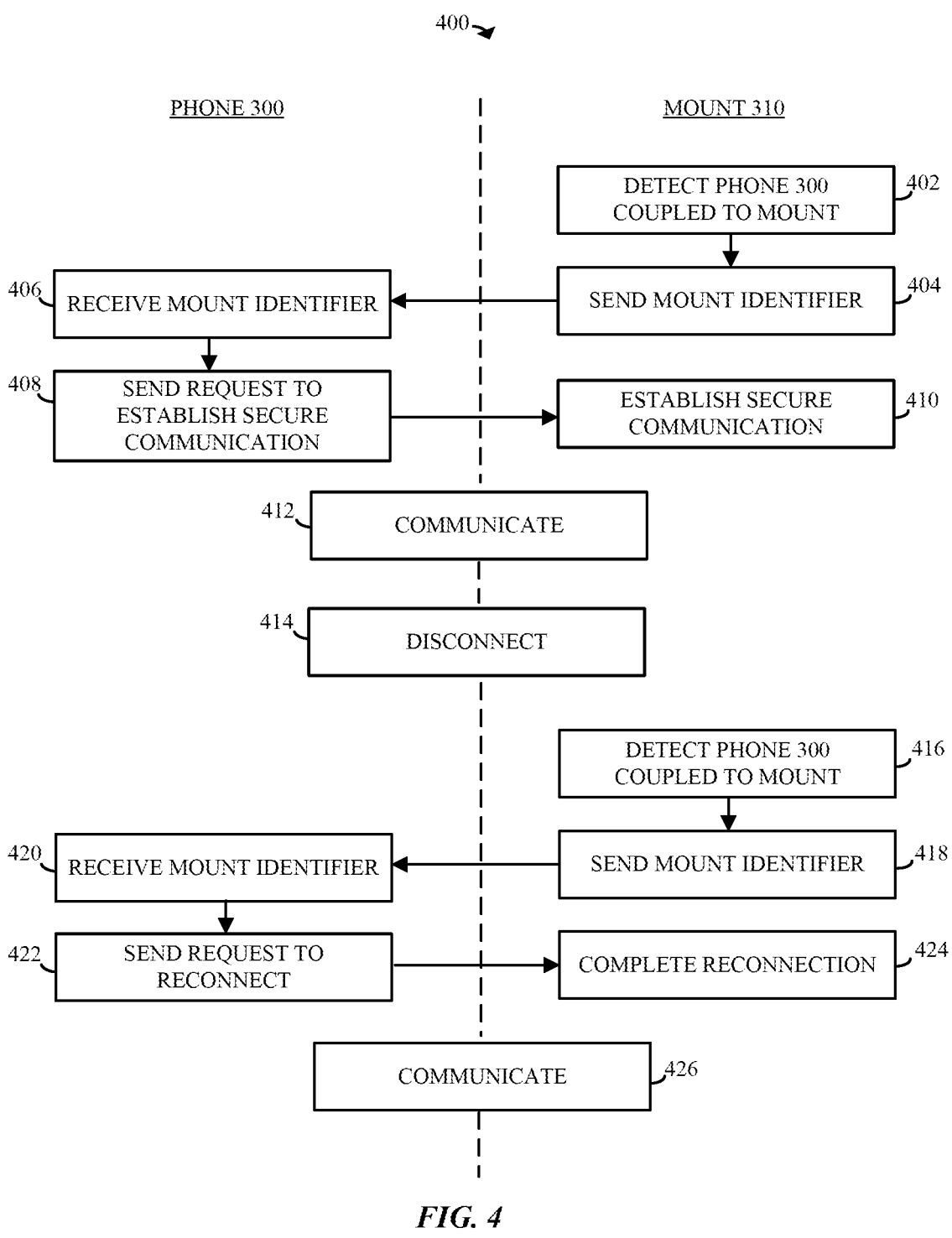
FIG. 4 is a flow diagram illustrating operations performed by a phone and a mount before, during, and after establishing a secure communication.

FIG. 4 is a flow diagram illustrating operations performed by phone 300 (e.g., phone 300 from FIGS. 3A-3B) and mount 310 (e.g., mount 310 from FIGS. 3A-3B) before, during, and after establishing a secure communication. The operations in FIG. 4 (referred to as flow 400) are, optionally, combined, the orders of some operations are, optionally, changed, and some operations are, optionally, omitted.

At 402, flow 400 includes mount 310 detecting that phone 300 is coupled to mount 310. In some examples, a RFID reader of phone 300 generates a magnetic field by passing an electric current through a coil. The magnetic field then induces an electric current within an RFID tag of mount 310 and thereby causing mount 310 to detect that phone 300 is coupled to mount 310 (e.g., by the fact that mount 310 is provided power and is activated). In other examples, phone 300 detects that the two devices are coupled and sends a message to mount 310 to indicate that the two devices are coupled. In such examples, receiving the message by mount 310 serves as mount 310 detecting that phone 300 is coupled to mount 310. In other examples, the coupling of phone 300 and mount 310 causes a state of a physical component of mount 310 to be modified (e.g., a physical button to be pressed or an electrical connection be made or broken), indicating that mount 310 is coupled to something else and serving as mount 310 detecting that phone 300 is coupled to mount 310. It should be recognized that mount 310 can detect that phone 300 is coupled to mount 310 in other ways known to a person of ordinary skill in the art and that such detection is a trigger for other operations to occur as discussed below.

At 404, flow 400 includes mount 310 sending a mount identifier to phone 300. In some examples, the mount identifier includes identification information of mount 310 such that phone 300 is able to distinguish phone 300 from another device. In such examples, the mount identifier is unique and/or predefined for mount 310. In other examples, the mount identifier can be assigned to mount 310 by phone 300. In either set of examples, the mount identifier is one or more bits that are optionally randomized. To continue an example described above, the mount identifier is stored in the RFID tag of mount 310 and be wirelessly transmitted to the RFID reader of phone 300 after the magnetic field induces an electric current with the RFID tag. For another example, the mount identifier is received from phone 300 during a previous connection and be used as the mount identifier when connecting with phone 300 specifically.

At 406, flow 400 includes phone 300 receiving the mount identifier from mount 310. In some examples, the mount identifier is received by phone 300 via a specific wireless technology (e.g., NFC, Bluetooth, or Wi-Fi). Then, at 408, flow 400 includes phone 300 sending a request to establish a secure communication with mount 310. While illustrated as coming from phone 300, it should be recognized that the request can come from mount 310 to phone 300. In some examples, the request is sent via the same wireless technology as used to receive the mount identifier (in some examples, the message with the mount identifier serves as the request to establish the secure communication). In other examples, the request is sent via a different wireless technology, such as the wireless technology that is used for the secure communication. In either set of examples, the wireless technology for the secure communication is different from the wireless technology used to transmit the mount identifier (e.g., the wireless technology for the secure communication can have a larger range than the wireless technology used to transmit the mount identifier). In some examples, the request is a request to establish a pairing between phone 300 and mount 310, such as a Bluetooth pairing. In such examples, the request can include a code that is used by at least one of the devices to communicate with the other securely.

At 410, flow 400 includes mount 310 establishing a secure communication with phone 300. It should be recognized that either device can establish the secure communication and that 410 is illustrating that the secure communication has been established. In some examples, establishing the secure communication includes establishing a code or set of keys to use when communicating between the devices. In such examples, the code or set of keys can be used to encrypt and/or decrypt a communication. After establishing the secure communication, phone 300 and mount 310 can communicate between each other, as illustrated as 412, until the secure communication is disconnected and/or phone 300 is no longer coupled to mount 310.

After 410 and at 414, flow 400 includes the secure communication between phone 300 and mount 310 disconnecting. In some examples, one of the devices can initiate the disconnection. For example, phone 300 and/or mount 310 can detect that phone 300 is no longer coupled to mount 310 and, in response, cause the secure communication to be terminated. In other examples, the secure communication between phone 300 and mount 310 is disconnected without either device explicitly causing the secure communication to be disconnected, such as due to signal strength or interference.

At 416, similar or the same as 402, mount 310 detects that phone 300 is coupled to mount 310. In response to detecting that phone 300 is coupled to mount 310, mount 310, at 418, sends a mount identifier to phone 300 (similar or the same as 404) and, at 420, phone 300 receives the mount identifier (similar or the same as 406).

After receiving the mount identifier, phone 300, in some examples, determines whether phone 300 has information to reestablish a secure communication with mount 310. For example, phone 300 can store a code or key used to communicate with mount 310 such that phone 300 does not need to establish a new code or key for secure communication with mount 310. In such examples, when phone has information to reestablish the secure communication, at 422, phone 300 sends a request to reconnect to mount 310. In some examples, the request includes data needed to reconnect the secure communication, such as a previously established code or key. In other examples, no request is sent, and phone 300 proceeds to communicating with mount 310 through a secure communication after receiving the mount identifier.

At 424, after sending the request at 422, mount 310 receives the request and completes reconnection. It should be recognized that either device can reestablish the secure communication and that 424 is illustrating that the secure communication has been reestablished. After reestablishing the secure communication, phone 300 and mount 310 are able to communicate between each other, as illustrated in 426, until the secure communication is disconnected and/or phone 300 is no longer coupled to mount 310.

FIG. 5 is a flow diagram illustrating method 500 for detecting data using different sensors. Some operations in method 500 are, optionally, combined, the orders of some operations are, optionally, changed, and some operations are, optionally, omitted. In some examples, method 500 is performed by a compute system (e.g., compute system 100) or a computer system (e.g., device 200). In some examples, method 500 is performed by a computer system (e.g., an electronic device, such as a user device or an electronic mount); in some examples, the electronic device is coupled (e.g., physically (e.g., wired) or magnetically) to the user device.

At 510, method 500 includes detecting that a computer system (e.g., a user device) is coupled (e.g., physically (e.g., wired) or magnetically) to a mount.

At 520, method 500 includes: in response to detecting that the computer system is coupled to the mount, causing the computer system to initiate a secure communication (e.g., a wireless connection) between the computer system and the mount, wherein such causing includes sending a message via a first type of communication channel (e.g., NFC) to the computer system, and wherein the message includes an identifier of the mount.

At 530, method 500 includes: after causing the computer system to initiate the secure communication between the computer system and the mount, receiving, via a second type of communication channel different from the first type of communication channel (e.g., Bluetooth) (in some examples, the second type of communication channel is a two-way communication channel, wherein the computer system communicates with the mount using the second type of communication channel, and wherein the mount communicated with the computer system using the second type of communication channel), a request to establish the secure communication (in some examples, the secure communication is secured using a secret code) between the computer system and the mount (in some examples, the request is processed such that the mount connects with the computer system).

In some examples, the first type of communication channel uses Near Field Communication (NFC), wherein the second type of communication channel uses a short-range technology (in some examples, the second type of communication channel uses a short-range technology, such as Bluetooth).

In some examples, method 500 includes: in response to detecting that the computer system is coupled to the mount, initiating charge of the computer system.

In some examples, the request to establish the secure communication includes a request to pair the mount with the computer system.

In some examples, the request to establish the secure communication includes a request to reestablish the secure communication using pairing information established before detecting that the computer system is coupled to the mount (in some examples, the secure communication between the mount and the computer system has been disconnected before receiving the request to establish the secure communication).

In some examples, method 500 includes: in response to determining that the computer system is uncoupled (and/or decoupled) from the mount, disconnecting (e.g., by the computer system or the mount) the secure communication between the computer system and the mount.

In some examples, detecting that the computer system is coupled to the mount includes identifying that the computer system is magnetically coupled to the mount.

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve how a device interacts with a user. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to change how a device interacts with a user. Accordingly, use of such personal information data enables better user interactions. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of image capture, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be displayed to users by inferring location based on non-personal information data or a bare minimum amount of personal information, such as the content being requested by the device associated with a user or other non-personal information.

What is claimed is:

1. A method, comprising:
by a mount:
detecting, at a first time, that a computer system is coupled to the mount;
in response to detecting, at the first time, that the computer system is coupled to the mount, causing the computer system to initiate a secure communication between the computer system and the mount, wherein such causing includes sending a message via a first type of communication channel to the computer system, and wherein the message includes an identifier of the mount;

after causing the computer system to initiate the secure communication between the computer system and the mount, receiving, via a second type of communication channel different from the first type of communication channel, a request to establish the secure communication, wherein the request to establish the secure connection includes a request to pair the mount with the computer system;

after receiving the request to establish the secure communication, detecting, at a second time different from the first time, that the computer system is coupled to the mount;

in response to detecting, at the second time, that the computer system is coupled to the mount, causing the computer system to reestablish the secure communication between the computer system and the mount by sending the identifier of the mount via the first type of communication channel from the mount to the computer system; and after the causing the computer system to reestablish the secure communication between the computer system and the mount, receiving, via the second type of communication channel, a request to reestablish the secure communication using pairing information established before detecting, at the second time, that the computer system is coupled to the mount.

2. The method of claim 1, wherein the first type of communication channel uses Near Field Communication (NFC), and wherein the second type of communication channel uses a short-range wireless technology.

3. The method of claim 1, further comprising:
in response to detecting, at the first time, that the computer system is coupled to the mount, initiating charge of the computer system.

4. The method of claim 1, wherein the mount is a motorized stand.

5. The method of claim 1, further comprising:
in response to determining that the computer system is uncoupled from the mount, disconnecting the secure communication between the computer system and the mount.

6. The method of claim 1, wherein detecting, at the first time, that the computer system is coupled to the mount includes identifying that the computer system is magnetically coupled to the mount.

7. A non-transitory computer-readable storage medium storing one or more programs configured to be executed by one or more processors of a mount, the one or more programs including instructions for:
detecting, at a first time, that a computer system is coupled to the mount;
in response to detecting, at the first time, that the computer system is coupled to the mount, causing the computer system to initiate a secure communication between the computer system and the mount, wherein such causing includes sending a message via a first type of communication channel to the computer system, and wherein the message includes an identifier of the mount;
after causing the computer system to initiate the secure communication between the computer system and the mount, receiving, via a second type of communication channel different from the first type of communication channel, a request to establish the secure communication, wherein the request to establish the secure connection includes a request to pair the mount with the computer system;

after receiving the request to establish the secure communication, detecting, at a second time different from the first time, that the computer system is coupled to the mount;

in response to detecting, at the second time, that the computer system is coupled to the mount, causing the computer system to reestablish the secure communication between the computer system and the mount by sending the identifier of the mount via the first type of communication channel from the mount to the computer system; and after the causing the computer system to reestablish the secure communication between the computer system and the mount, receiving, via the second type of communication channel, a request to reestablish the secure communication using pairing information established before detecting, at the second time, that the computer system is coupled to the mount.

8. The non-transitory computer-readable storage medium of claim 7, wherein the first type of communication channel uses Near Field Communication (NFC), and wherein the second type of communication channel uses a short-range wireless technology.

9. The non-transitory computer-readable storage medium of claim 7, wherein the one or more programs includes instructions for:

in response to detecting, at the first time, that the computer system is coupled to the mount, initiating charge of the computer system.

10. The non-transitory computer-readable storage medium of claim 7, wherein the mount is a motorized stand.

11. The non-transitory computer-readable storage medium of claim 7, wherein the one or more programs includes instructions for:

in response to determining that the computer system is uncoupled from the mount, disconnecting the secure communication between the computer system and the mount.

12. The non-transitory computer-readable storage medium of claim 7, wherein detecting, at the first time, that the computer system is coupled to the mount includes identifying that the computer system is magnetically coupled to the mount.

13. A mount, comprising:

one or more processors; and memory storing one or more programs configured to be executed by the one or more processors, the one or more programs including instructions for:

detecting, at a first time, that a computer system is coupled to the mount;

in response to detecting, at the first time, that the computer system is coupled to the mount, causing the computer system to initiate a secure communication between the computer system and the mount, wherein such causing includes sending a message via a first type of communication channel to the computer system, and wherein the message includes an identifier of the mount;

after causing the computer system to initiate the secure communication between the computer system and the mount, receiving, via a second type of communication channel different from the first type of communication channel, a request to establish the secure communication, wherein the request to establish the secure connection includes a request to pair the mount with the computer system;

after receiving the request to establish the secure communication, detecting, at a second time different from the first time, that the computer system is coupled to the mount;

in response to detecting, at the second time, that the computer system is coupled to the mount, causing the computer system to reestablish the secure communication between the computer system and the mount by sending the identifier of the mount via the first type of communication channel from the mount to the computer system; and after the causing the computer system to reestablish the secure communication between the computer system and the mount, receiving, via the second type of communication channel, a request to reestablish the secure communication using pairing information established before detecting, at the second time, that the computer system is coupled to the mount.

14. The mount of claim 13, wherein the first type of communication channel uses Near Field Communication (NFC), and wherein the second type of communication channel uses a short-range wireless technology.

15. The mount of claim 13, wherein the one or more programs includes instructions for:

in response to detecting, at the first time, that the computer system is coupled to the mount, initiating charge of the computer system.

16. The mount of claim 13, wherein the mount is a motorized stand.

17. The mount of claim 13, wherein the one or more programs includes instructions for:

in response to determining that the computer system is uncoupled from the mount, disconnecting the secure communication between the computer system and the mount.

18. The mount of claim 13, wherein detecting, at the first time, that the computer system is coupled to the mount includes identifying that the computer system is magnetically coupled to the mount.

* * * * *